Sept. 24, 1957    HENRI-GEORGES DOLL    2,807,777
COIL ASSEMBLY FOR GEOPHYSICAL PROSPECTING
Filed May 24, 1945
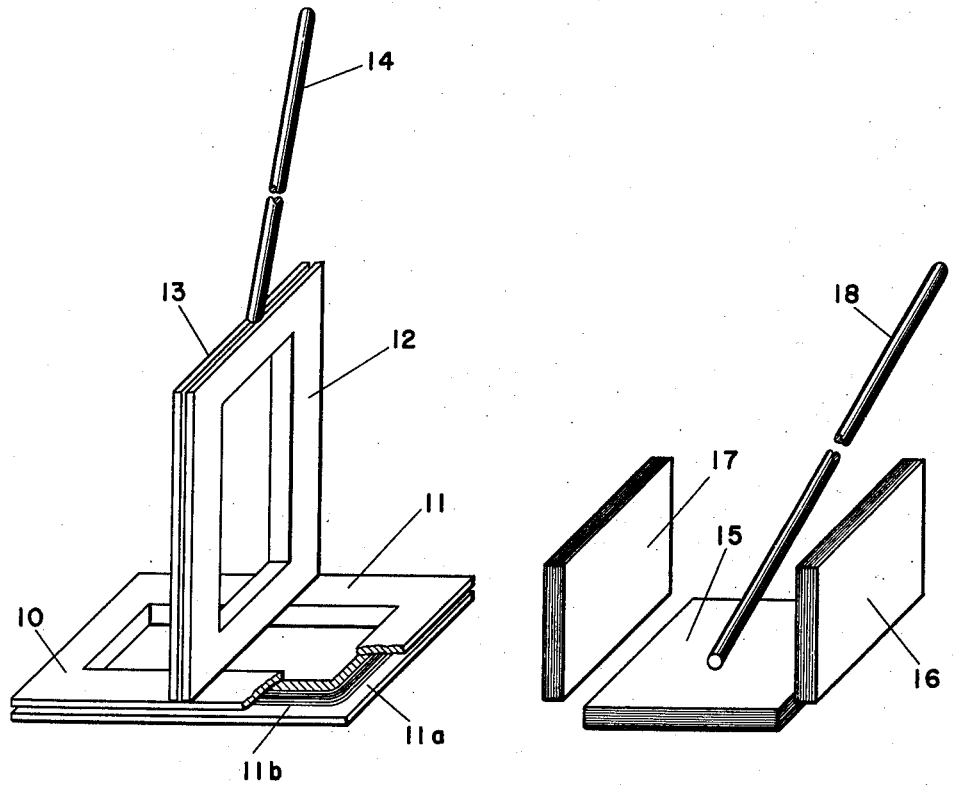
FIG. 1
FIG. 2
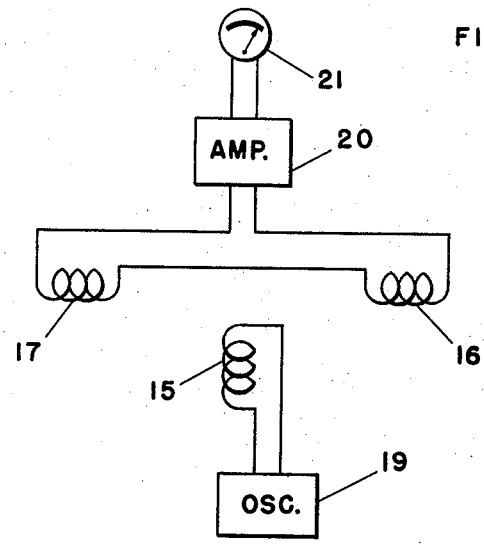
FIG. 3
INVENTOR.
HENRI-GEORGES DOLL
BY
ATTORNEYS

United States Patent Office 2,807,777
Patented Sept. 24, 1957

2,807,777

COIL ASSEMBLY FOR GEOPHYSICAL PROSPECTING

Henri-Georges Doll, Houston, Tex., assignor, by mesne assignments, to the United States of America as represented by the Secretary of the Army Application May 24, 1945, Serial No. 595,573

1 Claim. (Cl. 324—3)

This invention relates to coil assemblies, and it relates more particularly to coil assemblies for mutual inductance bridges of the type adapted to detect buried metallic and non-metallic objects such as, for example, buried bodies of metal, plastics, rock, explosives, and the like.

Mutual inductance bridges have been used heretofore for detecting metallic objects such as, for example, metallic land mines. Such a bridge usually includes an oscillator for energizing a transmitting coil by means of which eddy currents are set up in conductive materials near the coil. The device also includes a detecting or receiving coil coaxial with the transmitter coil which is excited by the current from the oscillator and also by the eddy currents in order to produce a voltage which, through a suitable amplifier, actuates an indicator.

The presence of a conducting material near, and unsymmetrically located with respect to, the coils changes the mutual inductance between them and is indicated by a change in the voltage and/or the phase in the receiving coil. Usually these devices include means for balancing the bridge circuit so that when the coils are not affected by the presence of conducting material, the voltage in the receiving coil is reduced to zero.

Devices of the type described generally above are usually fairly satisfactory for detecting metallic objects such as metallic land mines or other buried pieces of metal so long as they can be maintained in proper balance. However, the prior devices have not been useful for detecting non-conductive bodies such as the plastic type of land mine. The reason for this is that the sensitivity of the apparatus must be increased greatly in order to detect the non-conducting bodies in the earth. Inasmuch as such highly sensitive detectors can only give an indication which is a function of the conductivity of the earth and its distance from the coil, the detecting coil is very sensitive to the height at which it is operated above the earth. Therefore, when the detecting and transmitting coils are swept above the earth in the usual way in order to detect the mines, false signals will occur if the elevation of the coils above the ground varies. These false signals, in many instances, will completely mask the signals created by the presence of a non-metallic mine.

An object of the present invention is to provide a coil assembly which is substantially unaffected by the spacing between the detector coil and the earth.

Another object of the invention is to provide a coil assembly which is unaffected by tilting of the coil with respect to the surface of the earth.

A further object of the invention is to provide a coil assembly which permits determination of the distance of a conductive body beneath the surface of a relatively less conductive medium.

Other objects of the invention will become apparent from the following description of typical forms of devices embodying the present invention.

In accordance with the present invention, I have provided a coil assembly which includes a relatively flat coil adapted to be used as a transmitter coil and which preferably will be provided with a handle to permit it to be passed in a plane parallel to the surface of the earth and at least one additional coil of similar construction arranged at substantially a right angle to the plane of the transmitter coil.

A coil assembly of the type described generally above is symmetrical with respect to the field created by the transmitting coil and when the coils are properly arranged, no signal will be induced in the receiving coil by the transmitting coil.

The transmitting coil will create eddy currents in the ground or other medium which are symmetrical so long as the earth is substantially homogeneous. As a result under these conditions, the coil assembly may be swept back and forth above the ground and the height above the ground varied without producing a signal in the receiving coil. When the homogeneity of the earth or other material varies, the symmetry of the eddy currents will be altered, and as a result, currents will be induced in the receiving coil. The above described construction, therefore, is insensitive to changes in spacing between the earth and the coil assembly, and one of the factors which may result in false indications is eliminated thereby.

Such a coil assembly, however, will produce false signals if the coil assembly is tilted with respect to the earth, inasmuch as the receiving coil will then have a current induced in it due to dissymmetry of the field in the earth and its angular relationship with respect to the earth. Actually, such a system may give false signals even if the tilt of the coil assembly is very small.

In order to overcome the effects of tilting of the assembly, the preferred form of coil assembly is provided with three coils, one of which is horizontal and the other two are connected in series and disposed at substantially a right angle with respect to the horizontal coil. When the two substantially vertical coils are properly oriented with respect to each other and to the horizontal coil, the tilt effect on the coil assembly may be reduced to zero for any one elevation above the ground and substantially reduced for elevations which are near the one which produces zero tilt effect. In this way, the small errors which would normally result from small changes in elevation in sweeping the coil above the ground and the tilts unavoidably resulting from such a sweeping action can be minimized and a highly sensitive system provided for detecting both metallic and non-metallic objects.

The three-coil assembly may also be used to determine the depth to which a conducting medium is buried or the thickness of a layer of a non-conductor overlying such a conductive medium. Thus, knowing the spacing of the coil for zero tilt effect, and moving the coil until tilting does not provide a signal, the distance between the coil and the conductive medium becomes known. Then by measuring the distance between the coil and the surface of the non-conductor, the depth of the conductive medium becomes known.

For a better understanding of the present invention, reference may be had to the accompanying drawings in which:

Figure 1 is a diagrammatic showing of a typical coil assembly embodying the present invention partly broken away to disclose details of the coil;

Figure 2 is a perspective view of the preferred form of the invention utilizing three coils; and Figure 3 is a diagrammatic showing of a typical mine detecting system including coils of the type embodying the present invention.

As disclosed in Figure 1, a typical coil assembly which is insensitive to variations in spacing between the coils and the earth may include a first horizontal coil 10 which includes a generally rectangular wooden or other dielectric frame 11 having a peripheral groove 11a in which are laid a plurality of turns of wire 11b. The entire coil assembly may be enclosed in a water-tight or moisture-proof housing and may be shielded suitably. A second coil 12 of similar construction is disposed along the median line of the coil 10, and at a right angle to the plane of the coil 10. The frame or casing 13 of the coil 12 may be provided with a handle 14 by means of which the coil assembly can be swept substantially parallel with the surface of the earth. As indicated above, the angular relationship between the coils 10 and 12, when they are properly arranged, is such that a current is not induced in the coil 12 by the coil 10 when the assembly is not tilted and the material beneath the coil 10 is relatively homogeneous. When, however, a metallic or a non-metallic object is encountered having characteristics such as higher or lower conductivity than the surrounding medium, the eddy current field in the earth is rendered unsymmetrical with the result that the coil 12 has a voltage induced therein that may be utilized to provide a signal indicating the presence of the foreign object.

A voltage will also be induced in this type of coil assembly if the coil assembly is tilted during its movement relatively to the surface of the earth.

In order to overcome the tilting effect without rendering the device excessively sensitive to changes in elevation, the coil assembly disclosed in Figure 2 may be used. In this device, a horizontal coil 15, similar to the coil 12, is provided and two additional coils 16 and 17 are provided which are positioned at the lateral edges of the coil 15 and connected in series opposition. These coils are so arranged that when the assembly is tilted, the electromotive force induced in one will be increased while the electromotive force in the other will be decreased, with the result that the total electromotive force induced in the receiving coil is substantially nil under all conditions of normal tilt at a given distance from the surface of the earth. In an assembly such as that disclosed in Figure 2, and utilizing a coil 15 which is 6 inches wide and 7 inches long and coils 16 and 17 each of which is 4½ inches wide by 7 inches long, the coils 16 and 17 would be arranged at a right angle to the coil 10 when the assembly is to be used at a distance of 2 inches from the surface of the earth. This elevation is about normal for mine detecting operations.

For greater spacing between the surface of the earth and the horizontal coil 15, the coils 16 and 17 must be inclined inwardly so that the dihedral angle between the coils 15 and 17, and similarly the dihedral angle between the coils 15 and 16, is less than 90°. It has been found that for a working elevation of about five inches, these dihedral angles, which are always equal, should be about 45°. For elevations less than two inches, the coils 16 and 17 should be inclined outwardly, that is the dihedral angles are greater than 90°. By adjusting the coils 16 and 17 properly, it is possible to render them insensitive to tilts at any desired distance from the surface of the earth.

The device, in addition to being useful for detecting metallic and non-metallic objects, may be used for such purposes as determining the thickness of a layer of ice on a stream or lake. Thus, for example, if the distance of the coil 15 from a conductive material for a zero tilt error is adjusted to 14 inches and the device is moved above the surface of a body of ice and tilted and adjusted in elevation until zero tilt effect is obtained, it is possible to determine the distance between the water, which is relatively conductive, and the coil 15. By measuring the distance between the coil 15 and the surface of the layer of ice, it is thus possible by subtraction to determine the thickness of the layer of ice.

Coil assemblies of the type described above can be mounted on motor vehicles or wheels for use in detecting mines, or they may be provided with a handle 18, as shown in Figure 2, permitting sweeping motion of the device in the usual way.

Figure 3 discloses diagrammatically the manner in which the coils 15, 16, and 17 are connected in a mutual impedance bridge for use in detecting land mines. This detecting device includes an oscillator 19 of conventional type which is connected with the coil 15. The series connected coils 16 and 17 are connected with a suitable amplifier 20, the output of which is connected to a voltmeter 21 or similar signalling device.

It will be understood that the transmitter coil and the receiver coil or coils can be interchanged in the circuit without altering the operation of the circuit or the results obtained therewith. Thus, the two coils 16 and 17 can be connected to the oscillator and the coil 15 connected to the amplifier.

Such a device as that described above has many usages in addition to the detection of land mines, for example, the determination of the spacing of conductive materials from the surface of a non-conductive body, the detection of metallic objects in lumber, tires, or the detection of non-metallic or non-conducting objects in conductive media inasmuch as the sensitivity of the detector circuit can be increased greatly without rendering the system too sensitive to tilting or variations in the elevation of the coils.

It will be understood, therefore, that the coil assembly and associated system are susceptible to many usages other than mine detection and that the system can be modified considerably without departing from the invention. Thus the coil forms and the size of the coils may be varied widely and the manner in which they are supported for use may be modified as the purpose demands.

Therefore, the forms of the invention described above should be considered as illustrative and not as limiting the scope of the following claim.

I claim:

An apparatus for detecting buried land mines and the like comprising a unitary coil structure provided with manipulating means, said structure including a horizontally disposed relatively flat transmitter coil adapted to be passed in a plane parallel to and at a selected elevation with respect to the surface of the earth, means for energizing said coil by an alternating current, a pair of spaced receiver coils connected in series opposition and disposed contiguous the opposite edges of the transmitter coil which parallel the path normally traveled by said coil, said pair of coils being symmetrically disposed about a plane normal to and through a median line in the plane of said transmitter coil, the respective coils being arranged at a selected angle with respect to each other and to the plane of the transmitter coil, the selection of said angle being based upon the elevation at which transmitter coil is passed above the surface of the earth whereby the tilting effect upon the unitary coil structure is reduced to zero for such selected elevation and substantially reduced for elevations near that affording zero tilt effect.

References Cited in the file of this patent

UNITED STATES PATENTS

| | | |
|---|---|---|
| 1,499,979 | Gray | July 1, 1924 |
| 1,627,958 | Crossley | May 10, 1927 |
| 1,679,339 | Herr | July 31, 1928 |
| 1,812,392 | Zuschlag | June 30, 1931 |
| 1,871,345 | Rigante | Aug. 9, 1932 |
| 1,910,820 | Blinn | May 23, 1933 |
| 2,129,058 | Hedden | Sept. 6, 1938 |
| 2,160,356 | Fore | May 30, 1939 |
| 2,220,070 | Aiken | Nov. 5, 1940 |
| 2,220,788 | Lohman | Nov. 5, 1940 |

OTHER REFERENCES

Information Circular 6854, Joyce, Dept. of Interior, Bureau of Mines, pp. 10–13, Figs. 10–16, publ. 1935.